Inventor:
Jerry L. Stratton,
by Donald R. Campbell
His Attorney.

Inventor:
Jerry L. Stratton,
by Donald R. Campbell
His Attorney.

3,564,390

POWER CONVERTER CIRCUIT OPERATING AS AN ELECTRIC POTENTIAL TRANSFORMER

Jerry L. Stratton, Schenectady, N.Y., assignor to General Electric Company, a corporation of New York Filed Apr. 16, 1968, Ser. No. 721,643

Int. Cl. H02m 5/22

U.S. Cl. 321—60 1 Claim

ABSTRACT OF THE DISCLOSURE

A power converter circuit or electronic transformer for an A.-C. supply comprises a linear transformer whose windings are connected respectively to input and output terminals through inverter configuration switching circuits employing bidirectional conducting solid state switching devices or inverse-parallel pairs of unidirectional conducting solid state switching devices. By synchronously rendering conductive one switching device in the primary and secondary side switching circuits, and alternately and synchronously rendering conductive another device in each circuit at a switching rate substantially higher than the supply frequency, the input potential is converted to a higher frequency wave, transformed, and reconstructed at the output terminals. In this way the size of the transformer is reduced.

Figures 1A, 1B:
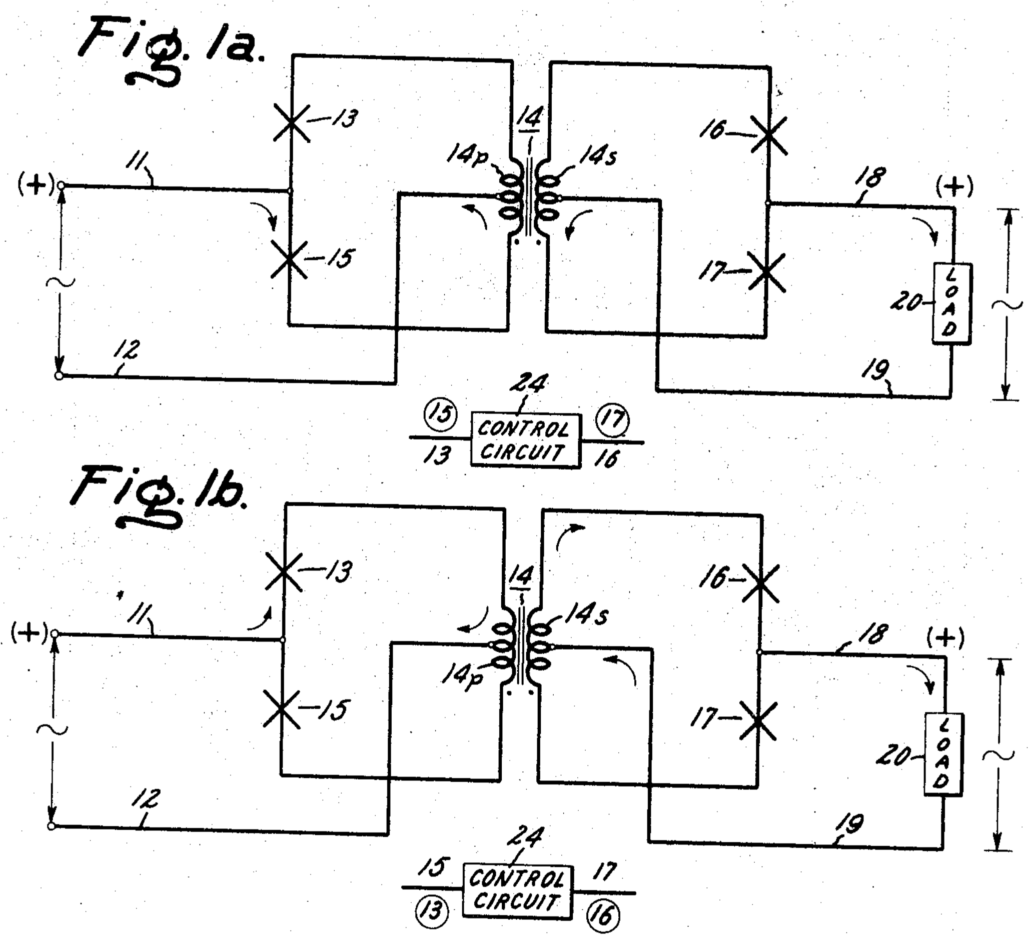

A concurrently filed application by William McMurray and assigned to the same assignee as the present invention, Ser. No. 721,817, discloses and claims power converter circuits based on the electronic transformer principle using solid state switching devices that are rendered nonconductive by a control electrode signal. Another concurrently filed application by William McMurray and assigned to the same assignee, Ser. No. 721,1664, now Pat. No. 3,487,289 discloses and claims similar power converter cricuits employing series capacitor commutated solid state thyristor switching devices.

This invention relates to power converter circuits, and more particularly to an electronic transformer for alternating current circuits comprising the combination of a linear transformer and a plurality of solid state switching devices coupled with the transformer windings.

Electrical transformers used in power circuits to transform A.-C. voltages having a frequency in the range of commercially available frequencies from about 25 Hz. to 400 Hz. are often large, heavy pieces of equipment. For there are other applications where space or weight is a many applications this is no particular disadvantage, but strong consideration and it would be desirable to reduce the size and weight of the transformer. While it is known that a high frequency transformer is much smaller physically than a transformer which operates at the aforementioned lower frequencies, and that a D.-C. or A.-C. potential can be converted to a higher frequency A.-C. potential by solid state inverter techniques, it has not heretofore been suggested that these separate technologies be combined to reduce the size of a transformer, or that they be combined in the manner to be described to form an electronic transformer. There is the further possibility that with the increasing availability of low cost solid state switches that the total cost of the electronic transformer including the higher frequency transformer with its associated switching circuits will be less than that of a conventional transformer. This is especially so since the presence of the solid state switches suggests that they can be used for other purposes such as current interruption.

Accordingly, an object of the invention is to reduce the required physical size of a linear transformer by the use of solid state switching devices in combination with a higher frequency transformer link.

Another object is to provide an electronic transformer or power converter circuit for A.-C. voltages comprising a transformer having inverter configuration input and output switching circuits interconnected with its windings for converting the input voltage to a high frequency wave which is transformed and reconstructed at the desired voltage level with the same wave shape.

Yet another object is the provision of an electronic transformer of the foregoing type wherein the solid state switches employed in the switching circuits have some additional function such as current interruption.

In accordance with the invention, the power converter circuit includes a linear transformer having a pair of inductively coupled windings. A first switching circuit includes at least a pair of alternately conductive solid state switching means, each of which is effectively connected in series circuit relationship with at least a portion of one of the transformer windings across a first pair of terminals in which appears an alternating current electric potential. A second switching circuit includes at least a pair of alternately conductive solid state switching means each of which is effectively connected in series circuit relationship with at least a portion of the other transformer winding across a second pair of terminals. The solid state switching means comprise a bidirectional conducting switching device or a pair of inverse-parallel connected unidirectional conducting devices. Control means are provided for synchronously rendering conductive one of the switching means in each of the switching circuits, and for alternately and synchronously rendering conductive at least one of the other switching means in each of the switching circuits at a switching rate substantially higher than the frequency of the potential appearing in the first pair of terminals. In this manner the input electric potential is converted to a higher frequency wave, transformed, and reconstructed at the other pair of terminals. The switching rate of the solid state switching means is preferably relatively high, in the order of 1,000 Hz. to 10,000 Hz.

Figure 3:
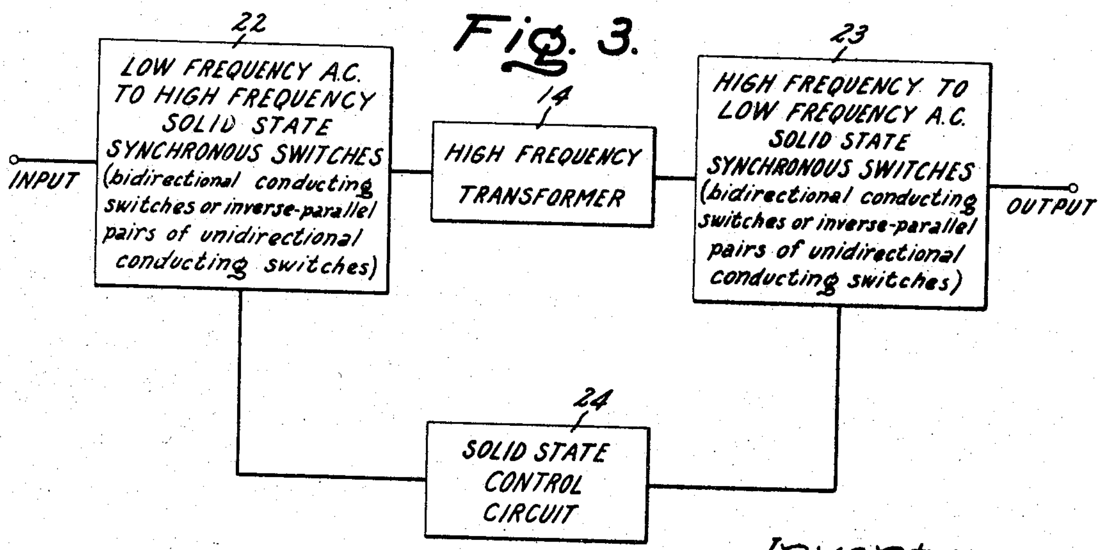
Figure 2A:
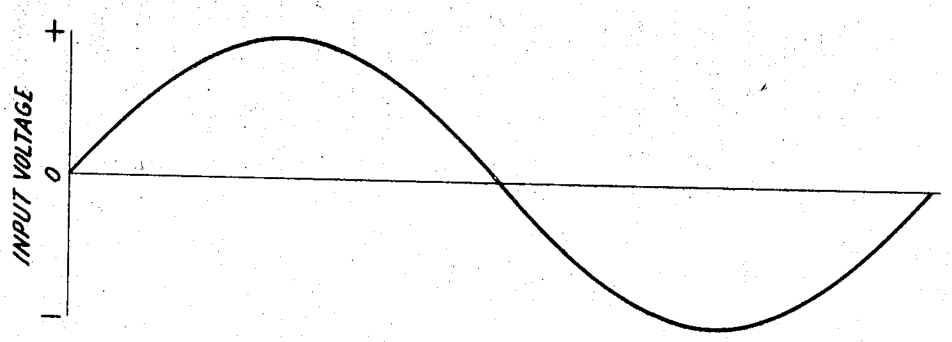
Figure 2B:
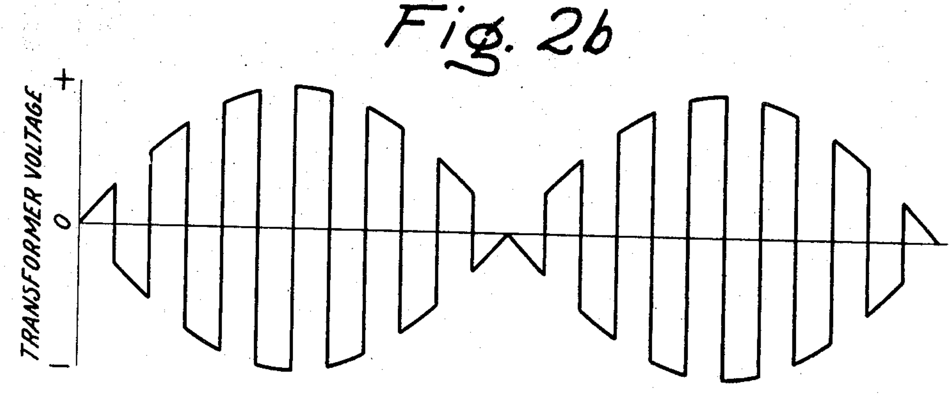
Figure 2C:
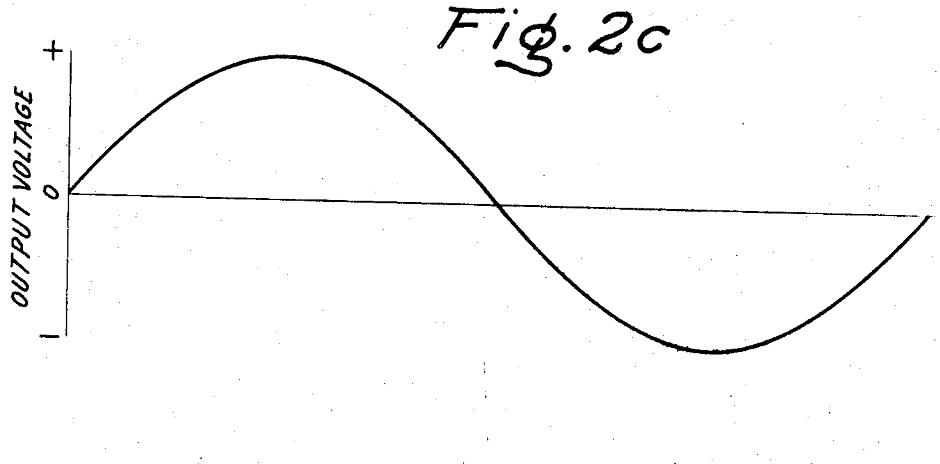

The foregoing and other objects, features, and advantages of the invention will be apparent from the following more particular description of a preferred embodiment of the invention, as illustrated in the accompanying drawings wherein:

FIGS. 1*a* and 1*b* are schematic circuit diagrams of a simplified electronic transformer power converter circuit to illustrate the principles of the invention, showing respectively the condition of the circuit during each high frequency half cycle;

FIGS. 2*a* to 2*c* are waveform diagrams for the electronic transformer of FIGS. 1; FIGS. 2*a* and 2*c* are respectively the input and output voltages, and FIG. 2*b* is the higher frequency transformer voltage; and FIG. 3 is a block diagram of the circuit of FIG. 1.

Referring to FIG. 1*a*, a low frequency alternating current source of electric potential such as a commercially available 60 Hz. source is applied to the input terminals 11 and 12 of the power converter circuit. The input terminal 11 is connected through a first bidirectional conducting solid state switch 13 (the solid state switching devices are illustrated here diagrammatically as large X's) to one end of the primary winding 14*p* of a high frequency linear coupling transformer 14, and is also connected through a second bidirectional conducting solid state switch 15 to the other end of the primary winding 14*p*. The high frequency transformer 14 is a center-tapped transformer, and the center tap of the primary winding 14*p* is coupled to the other input terminal 12. On the secondary side of the transformer, the two ends of the secondary winding 14*s* are connected in a similar fashion through the respective solid state switches 16 and 17 to one output terminal 18, while the other output terminal 19 is coupled to the center tap of the secondary winding A load 20 is connected across the output terminals 18 and 19.

The four solid state switches 13, 15, 16, and 17 are operated in pairs in synchronism to convert the low frequency waveform into a high frequency wave which is given the desired voltage transformation in the transformer 14 and is reconstructed on the other side of the transformer for application to the load 20. FIGS. 1*a* and 1*b* show the condition of the circuit for the two half cycles of the high frequency wave, assuming that the input alternating current waveform is poled such that the terminal 11 is positive with respect to the terminal 12 and that for purposes of simplification the transformer 14 has a unity turns ratio. During the first half cycle of the high frequency wave, switches 15 and 17 are rendered conductive synchronously, while the other two switches 13 and 16 are turned off or changed from their low impedance state to their high impedance condition in synchronism at the same time. Suitable signals for turning on the solid state switches are generated in a control circuit 24, and the switches rendered conductive in the two high frequency half cycles are indicated respectively above and below the horizontal lines. The two switches actually conducting are circled. With the switches 15 and 17 conducting, the dot ends of the primary and secondary windings of the high frequency coupling transformer 14 are positive and the direction of the current through the circuits at the primary side and the secondary side of the transformer are as indicated by the arrows. It will be noted that the ouput terminal 18 is positive with respect to the other output terminal 19. During the other half cycle of the high frequency wave as shown in FIG. 1*b*, the switches 13 and 16 are conducting, while the other two switches 15 and 17 are now turned off. Since the frequency of the high frequency wave is considerably higher than that of the low frequency source, the input terminal 11 is still positive. The polarity of the voltages in the transformer 14 are reversed, however, and the no-dot ends are now positive so that the current flow through the transformer windings is in the other direction. On the secondary side, the output terminal 18 is still positive with respect to the terminal 19 and the direction of current through the load 20 is in the same direction. Thus, the voltage magnitude and polarity applied to the load remains the same as that of the input which in this particular instance is some slowly varying positive value.

The waveform diagram in FIG. 2*a* shows the sine wave input voltage or source voltage for the power converter circuit, and it can be seen from the transformer voltage waveform in FIG. 2*b* that the polarity of the transformer voltage changes at the high frequency switching rate, shown here for purposes of illustration as being 720 Hz. for a 60 Hz. input. It is desirable that the high frequency rate be relatively high in order to materially reduce the size of the transformer that is needed, and is preferably in the order of 1,000 Hz. to 10,000 Hz. The output voltage or load voltage (see FIG. 2*c*) has the same wave shape as the input voltage. Although for clarity the transformer turns ratio is assumed to be unity, and thus the instantaneous magnitudes of the input and output voltages in FIGS. 2*a* and 2*c* are the same, it will be understood that in practice the desired voltage transformation is obtained according to the turns ratio. The power converter circuit thus acts like an electronic transformer.

On the other half cycle of the low frequency A-C input, the input terminal 11 will now be negative with respect to the terminal 12. Alternately and synchronously rendering conductive the switches 15 and 17, and then switches 13 and 16, at the high frequency rate in like manner switches the high frequency voltage at the secondary side of the transformer so that the terminal 18 is always negative with respect to the terminal 19 and the flow of current through the load 20 during the negative low frequency half cycle is always in the other direction. It will be noted that in this version of the power converter circuit in the center-tapped transformer circuit configuration, there is always a closed path for current to flow from one side to the other, including the transformer coupling path, so that ideally no energy storage components are required.

In the block diagram of this new power converter circuit shown in FIG. 3, the high frequency transformer link 14 will be noted between the circuit 22 on the primary side of the transformer and the circuit 23 at the secondary side of the transformer which as indicated both contain solid state synchronous switches, and appropriate solid state electronic controls 24 are provided to operate the switches in the primary side frequency step-up circuit 22 and the secondary side frequency step-down circuit 23. As is indicated, the solid state switches can be bidirectional conducting power devices, of which the triac and diac are examples, or can be a pair of inverse-parallel connected unidirectional conducting power devices, such as the silicon controlled rectifier, the transistor, and the gate turn-off silicon controlled rectifier. The latter two devices can be rendered nonconductive by a control electrode signal without regard to the circuit voltage and current, but when the first mentioned thyristor type devices are employed, suitable commutation means must be provided in order to turn off the devices, as for instance, by means of commutation pulses derived in an external pulse source. Appropriate gating and commutation circuits for the solid state switches are not shown since they can use conventional techniques, as taught for example in the SCR Manual, 4th Edition, published by the General Electric Company, Semiconductor Products Department, Syracuse, N.Y., and in the GE Transistor Manual obtainable at the same address.

In order to effect a meaningful reduction in the size of the transformer 14, the high frequency switching rate of the solid state switches should be substantially higher than the frequency of the input voltage. More advantageously, the switching rate is relatively high as compared to the frequency of the input voltage, and is desirably 10,000 Hz. or at least in the order of about 3,000 Hz. to 10,000 Hz. At a frequency of 10,000 Hz. transformers made of low loss powdered iron or ferrite core materials can be used, and a high frequency transformer further has low interwinding capacitance. Experimental devices have been operated at a frequency of 50 kHz. and could produce further savings when available commercially. The low frequency input voltage will usually be within the range of commercially available frequencies, namely, 25 Hz. to 400 Hz. It will be appreciated, however, that as to its essential features the invention is not limited to these frequency ranges, and in any event the electronic transformer power converter circuit may have some advantage in other situations where the switching rate of the inverter configuration switching circuit is at least substantially higher than the input voltage frequency.

This is particularly true in view of the fact that in addition to the voltage transformation and isolation functions provided by the high frequency transformer 14, the presence of the four switches 13, 15, 16, and 17 suggests that they can be operated to obtain some additional function such as current interruption. When too high a current flows in the load, the switches 13 and 15 can be opened or rendered nonconductive while the switches 16 and 17 are kept operating to permit reactive current to die out, and then are turned off at the first input frequency current zero for complete isolation. That is to say, the circuit acts as a static circuit breaker when switches 13 and 15 or switches 16 and 17 are in their high impedance state.

Although the inverter configuration switching circuits on the primary and secondary side of the transformer 14 are shown by way of illustration in the center-tapped transformer circuit configuration, the switching circuits can be implemented in other inverter circuit configurations, such as the half bridge or full bridge.

While the invention has been particularly shown and described with reference to a preferred embodiment thereof, it will be understood by those skilled in the art that these and other changes in form and details may be made therein without departing from the spirit and scope of the invention.

What I claim as new and desire to secure by Letters Patent of the United States is:

1. A solid state power converter circuit functioning as an alternating current transformer comprising the combination of a high frequency linear transformer having inductively coupled primary and secondary windings, a first switching circuit including a pair of alternately conductive bidirectional conducting controlled solid state switching means, each of which is connected in series circuit relationship with at least a portion of said primary transformer winding across a first pair of terminals in which appears a low frequency alternating current electric potential, a second switching circuit including another pair of alternately conductive bidirectional conducting controlled solid state switching means, each of which is connected in series circuit relationship with at least a portion of said secondary transformer winding across a second pair of terminals, and control means for synchronously rendering conductive one of the solid state switching means in each switching circuit for a predetermined interval of conduction, and for alternately and synchronously rendering conductive the other solid state switching means in each switching circuit for an approximately equal interval of conduction, wherein said intervals of conduction are closely adjacent and nonoverlapping, said control means operating to switch said switching means at a relatively high switching rate as compared to the frequency of the low frequency electric potential appearing in the first pair of terminals and in sequence to reconstruct at the second pair of terminals an alternating current voltage having the same frequency and substantially the same wave shape as the low frequency electric potential, whereby the low frequency electric potential is converted to a high frequency wave, transformed, and reconstructed as a transformed electric potential with the same low frequency.

References Cited

UNITED STATES PATENTS

| | | | |
|---|---|---|---|
| 2,359,727 | 10/1944 | Brown | 321—2 |
| 2,907,944 | 10/1959 | Hume | 321—69 |
| 3,027,522 | 3/1962 | Boxall et al. | 330—10X |
| 3,246,231 | 4/1966 | Clarke | 321—69 |
| 3,319,147 | 5/1967 | Mapham | 321—60X |

WILLIAM M. SHOOP, Jr., Primary Examiner

U.S. Cl. X.R.

321—69